United States Patent
Hong et al.

(10) Patent No.: US 6,940,687 B2
(45) Date of Patent: Sep. 6, 2005

(54) RIGID HOUSING MEMBER FOR A DATA STORAGE DEVICE WITH INTEGRATED CONTAMINANT ADSORBENT FILTER

(75) Inventors: Yiren Hong, Singapore (SG); Pohlye Lim, Singapore (SG); Niroot Jierapipatanakul, Singapore (SG); Boon Seng Ong, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 51 days.

(21) Appl. No.: 10/306,597

(22) Filed: Nov. 27, 2002

(65) Prior Publication Data

US 2004/0012881 A1 Jan. 22, 2004

Related U.S. Application Data

(60) Provisional application No. 60/397,413, filed on Jul. 19, 2002.

(51) Int. Cl.[7] .............................................. G11B 33/14
(52) U.S. Cl. .................................................. 360/97.02
(58) Field of Search ........................ 360/97.02, 97.01, 360/88; 720/648, 600, 655

(56) References Cited

U.S. PATENT DOCUMENTS

| | | | |
|---|---|---|---|
| 4,369,475 A | 1/1983 | Ho et al. ................. | 360/97.02 |
| 4,772,974 A | 9/1988 | Moon et al. .............. | 360/78.04 |
| 4,863,499 A | 9/1989 | Osendorf ..................... | 96/134 |
| 5,229,899 A | 7/1993 | Brown et al. ............ | 360/97.02 |
| 5,590,001 A | 12/1996 | Ino et al. ................. | 360/97.02 |
| 5,877,915 A | 3/1999 | Ishida ..................... | 360/97.03 |
| 5,907,454 A | 5/1999 | Ahn ........................ | 360/97.03 |
| 6,088,190 A | 7/2000 | Anderson ................ | 360/97.02 |
| 6,128,159 A | 10/2000 | Ino ......................... | 360/97.02 |
| 6,168,681 B1 | 1/2001 | Bellefeuille et al. ........ | 156/290 |
| 6,214,070 B1 | 4/2001 | Crowder et al. .............. | 55/320 |
| 6,238,467 B1 | 5/2001 | Azarian et al. ............... | 96/135 |
| 6,266,208 B1 | 7/2001 | Voights ................... | 360/97.02 |
| 6,296,691 B1 | 10/2001 | Gidumal ........................ | 96/17 |
| 6,395,073 B1 | 5/2002 | Dauber ........................ | 96/134 |
| 2002/0063990 A1 | 5/2002 | Hirasaka et al. ......... | 360/97.02 |
| 2002/0149871 A1 * | 10/2002 | Tanaka ........................ | 360/69 |

* cited by examiner

Primary Examiner—Julie Anne Watko
(74) Attorney, Agent, or Firm—Jennifer M. Buenzow

(57) ABSTRACT

Method and apparatus for protecting a data storage device from fluid-borne contaminants. The device includes a housing in which a rotatable disc is disposed. The housing is formed from first and second rigid housing members. The first housing member is provided with an exterior filter support surface, an opposing interior surface and at least one filter access aperture. A contaminant adsorbent filter is placed on the exterior filter support surface, and a seal is applied to the first housing member to encapsulate the filter. During subsequent rotation of the disc, fluidic currents pass across the interior surface, through the at least one filter access aperture and to the adsorbent filter. Preferably, the filter is installed after the first and second housing members are mated. The filter support surface is preferably formed as part of a recess in the first housing member which projects into the housing.

11 Claims, 4 Drawing Sheets

RIGID HOUSING MEMBER FOR A DATA STORAGE DEVICE WITH INTEGRATED CONTAMINANT ADSORBENT FILTER

RELATED APPLICATIONS

This application claims domestic priority under 35 U.S.C. §119(e) to U.S. Provisional Application No. 60/397,413 filed Jul. 19, 2002.

FIELD OF THE INVENTION

The claimed invention relates generally to data storage devices and more particularly to the directing and filtering of recirculating fluidic currents established within a data storage device.

BACKGROUND

Disc drives are digital data storage devices which store and retrieve large amounts of user data in a fast and efficient manner. The data are magnetically recorded on the surfaces of one or more data storage discs affixed to a spindle motor for rotation at a constant high speed.

An array of vertically aligned data transducing heads are controllably positioned by an actuator to read data from and write data to tracks defined on the recording surfaces. An actuator motor rotates the actuator to move the heads across the disc surfaces. The heads are configured to be aerodynamically supported over these surfaces by fluidic (for example, air) currents established by the high speed rotation of the discs.

It is desirable to minimize the presence of fluid-borne particulate and vapor phase (gaseous) contamination within a data storage device housing, as such contamination can adversely affect data storage and transfer performance. Data storage housings are typically sealed using gaskets and similar features to prevent the ingress of contaminants from the external environment.

It has been found that a large pressure differential between the interior and exterior of a housing (such as by elevated temperatures or changes in altitude) can potentially lead to failure of the housing seal. Thus, instead of providing a completely sealed housing, designers typically provide a small diffusion path between the interior of the housing to the external environment to allow equalization of interior and exterior atmospheric pressures.

A typical diffusion path (diffusion tube) is formed through a housing wall and provides an elongated, narrow channel which permits fluidic flow while at the same time restricting passage of contaminants along the length of the channel.

Filters are further typically placed within the housing to remove contaminants from the internal recirculating fluidic currents established by rotation of the discs. Such filters typically include pass-through recirculation filters and chemical adsorbent filters.

A pass-through recirculation filter generally captures fluid-borne particulates as fluidic currents are directed through the filter. A typical construction includes pieces of filter media (such as polytetrafluoroethylene, PTFE) laminated to a nonwoven backing material or a fabric encapsulated, pillow-shaped filter containing electrostatic or other filter media.

A chemical adsorbent filter generally adsorbs gaseous and small diameter particulate contaminants as fluidic currents pass across a surface of the filter. A wide variety of constructions have been proposed including the use of activated carbon and silica based desiccant granules as an adsorbent media. The adsorbent media is typically melded into a contiguous block (brick) or is encapsulated within a semi-rigid permeable boundary layer of material.

Disc drive designers are constrained by a number of factors, including continually reduced form factors and internal clearance issues, to provide effective filtering and flow control. With the continued demand for higher performance data storage devices, there remains a continual need for improved approaches to directing and filtering recirculating fluidic currents within such devices. It is to such improvements that the claimed invention is directed.

SUMMARY OF THE INVENTION

As embodied herein and as claimed below, the present invention is generally directed to a method and apparatus for protecting a data storage device from fluid-borne contaminants.

In accordance with preferred embodiments, a data storage device comprises a first rigid housing member with an exterior filter support surface, an opposing interior surface and at least one filter access aperture which projects from the interior surface to the exterior filter support surface.

A second rigid housing member is affixed to the first rigid housing member to form an enclosed housing. A rotatable disc is supported within the enclosed housing in an adjacent facing relationship to the interior surface.

A contaminant adsorbent filter is disposed adjacent the exterior filter support surface in fluidic communication with the at least one filter access aperture. An external seal is affixed to the first rigid housing member across the adsorbent filter. During rotation of the disc, fluidic currents pass into a gap between the disc and the interior surface, through the at least one filter access aperture and to the adsorbent filter.

The adsorbent filter is preferably installed in a top-down automated assembly environment and is placed onto the exterior filter support surface after the first housing member is attached to the second housing member.

Preferably, the adsorbent filter is affixed to the exterior filter support surface using a layer of adhesive. The seal is also preferably affixed to the first rigid housing member using a layer of adhesive.

The exterior filter support surface of the first rigid housing member is preferably formed as a portion of a recess which projects toward the data recording disc. The recess preferably has a depth selected to substantially match a thickness of the adsorbent filter.

The recess is provided with at least one sidewall adjacent the exterior filter support surface. The sidewall is preferably configured to direct a portion of the recirculating fluidic currents away from the adsorbent filter and to other locations within the housing, such as to a recirculation filter and to convectively cool an actuator motor. One or more filter access apertures are preferably formed in the at least one sidewall to further direct the recirculation currents to the filter.

The first rigid housing member further comprises an elongated diffusion tube recess having a first end in fluidic communication with the exterior filter support surface, and wherein the seal further extends adjacent the diffusion tube recess to form a diffusion tube from the exterior filter support surface to a second end of the diffusion tube recess disposed in fluidic communication with an environment external to the enclosed housing.

As desired, a rigid damping member can be preferably affixed to the first rigid housing member adjacent the exterior filter support surface to provide constrain layer damping of the first rigid housing member. A thickness of the rigid damping member of the attaching step is preferably selected to nominally match a thickness of the adsorbent filter.

Additionally, method steps carried out in accordance with preferred embodiments include providing a first rigid housing member with an exterior filter support surface, an opposing interior surface and at least one filter access aperture which projects from the interior surface to the exterior filter support surface.

A contaminant adsorbent filter is placed on the exterior filter support surface in fluidic communication with the at least one filter access aperture. A seal is applied to the first rigid housing member opposite the interior surface to encapsulate the adsorbent filter.

In this way, during subsequent rotation of a data recording disc adjacent the interior surface, fluidic currents pass across the interior surface, through the at least one filter access aperture and to the adsorbent filter.

Preferably, further method steps are carried out including supplying a second rigid housing member, and attaching the first rigid housing member to the second rigid housing member to form an enclosed housing. The attaching of the first rigid housing member to the second rigid housing member is preferably carried out prior to the placing of the adsorbent filter onto the filter support surface, allowing fabrication in a top down automated environment.

These and various other features and advantages which characterize the claimed invention will become apparent upon reading the following detailed description and upon reviewing the associated drawings.

DETAILED DESCRIPTION

Figure 1:
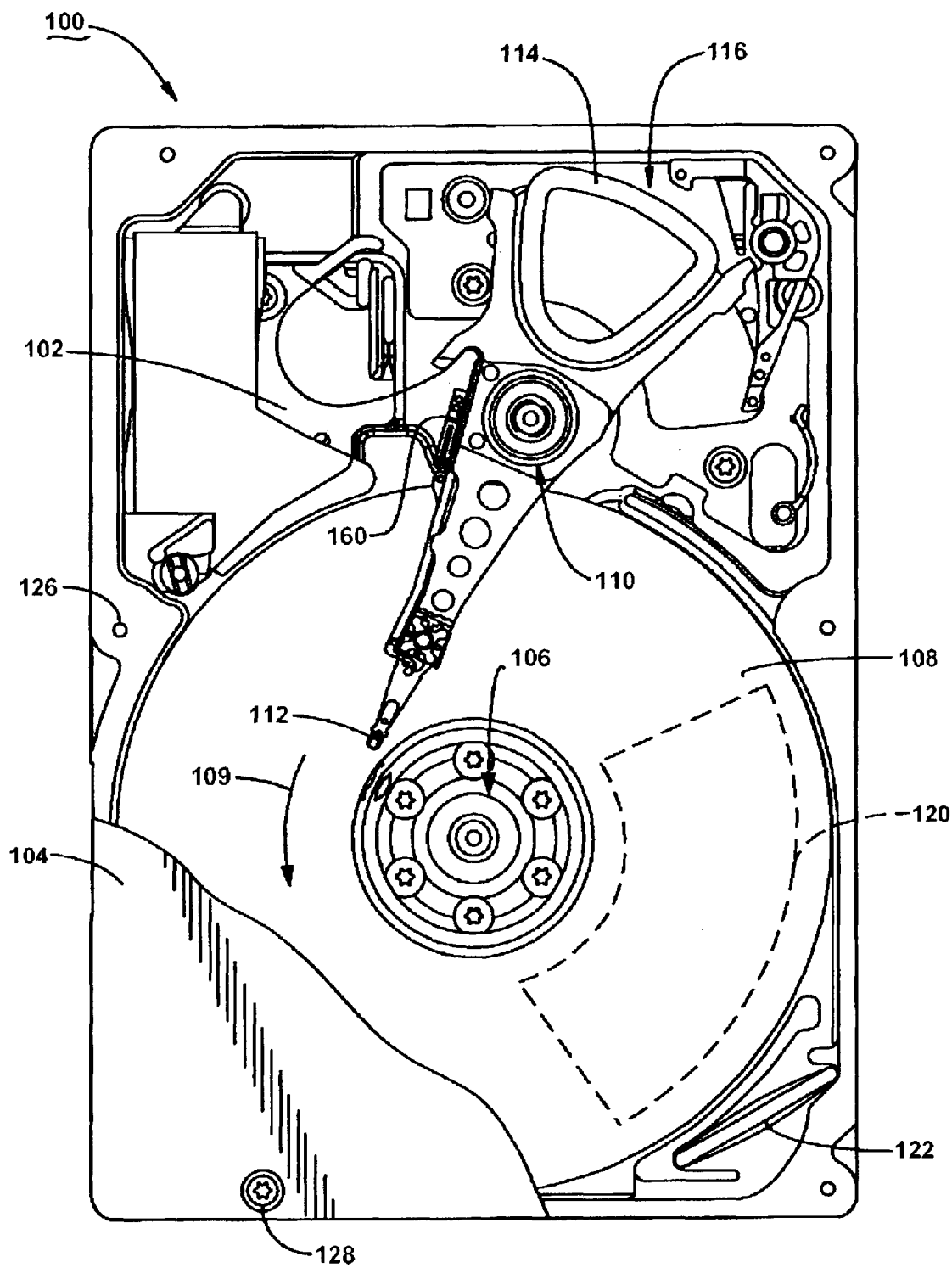
FIG. 1 is a top plan view of a data storage device constructed in accordance with preferred embodiments of the present invention to store data to a rotatable disc, the data storage device utilizing a filter assembly integrated into a top cover of the data storage device housing.

FIG. 1 provides a top plan view of a data storage device constructed in accordance with preferred embodiments of the present invention. The data storage device is preferably characterized as a disc drive 100 which magnetically stores digital data from a host device (not shown).

The disc drive 100 includes an enclosed housing 101 which defines and internal environment for the drive. The housing 101 is formed by mating of a pair of substantially planar, rigid housing members (plates) comprising a base deck 102 and a top cover 104 (shown in partial cutaway).

A spindle motor 106 supported within the housing 101 rotates a number of magnetic recording discs 108 at a constant, high speed in direction 109. A rotary actuator 110 controllably moves a corresponding number of data transducing heads 112 across recording surfaces of the discs 108 through application of current to a coil 114 of a voice coil motor (VCM) 116.

The heads 112 are aerodynamically supported over the recording surfaces by fluidic currents established by rotation of the discs 108. For purposes of the present discussion, it will be contemplated that the disc drive 100 includes two discs 108 and four heads 112, although other numbers of discs and heads can be used as desired.

An internal chemical adsorbent filter is identified diagrammatically at 120. The filter 120 is supported by the top cover 104 and adsorbs vapor phase (gaseous) contaminants from the recirculating fluidic currents established within the housing 101. As desired, the top cover 104 and adsorbent filter 120 further preferably operate to direct other portions of the fluidic currents within the housing 101, including to a pass-through recirculation filter 122.

Figure 2:
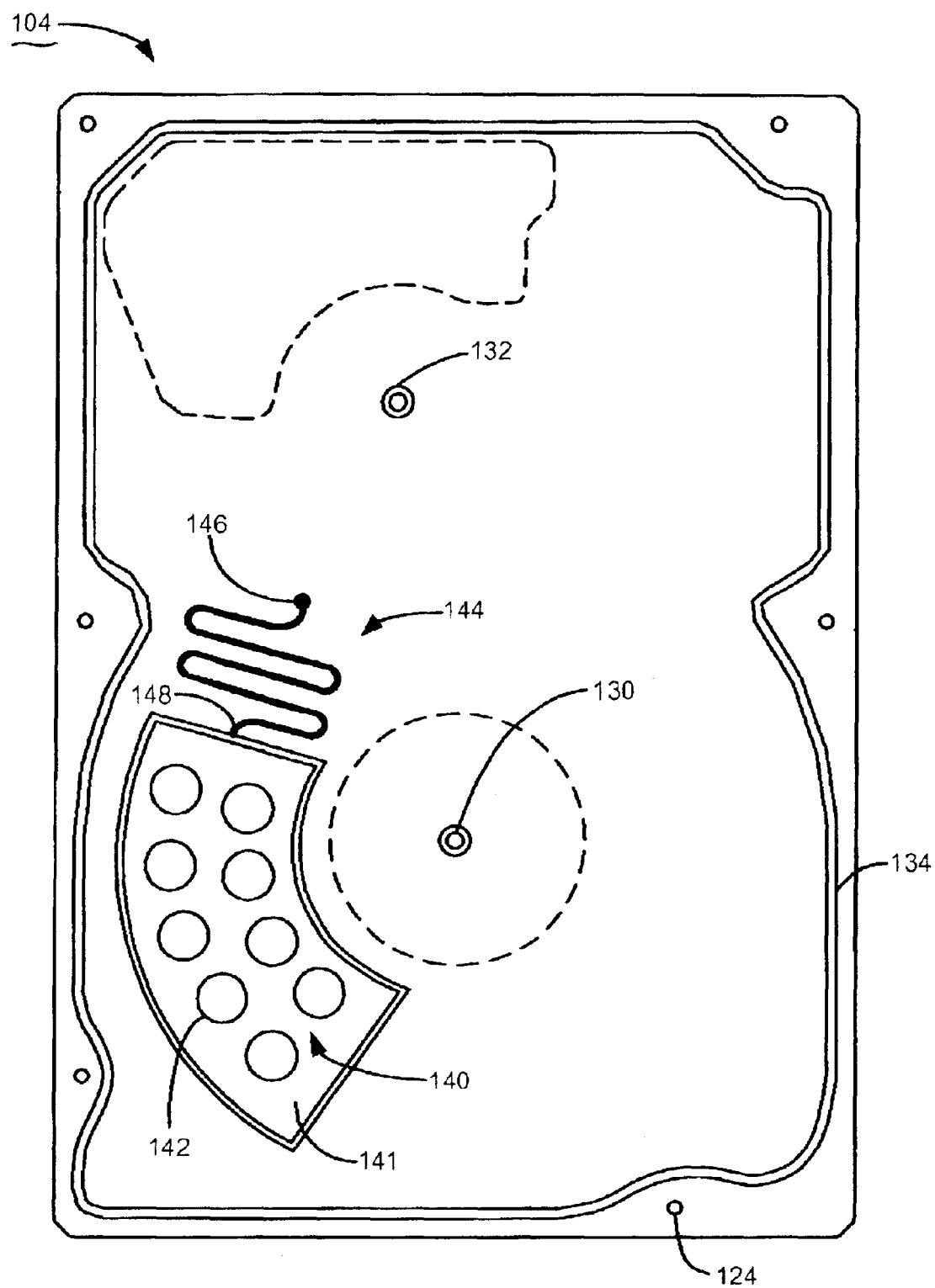
FIG. 2 shows the underside of the top cover to illustrate a preferred configuration and placement of the filter assembly and top cover.

FIG. 2 provides a plan view of the underside of the top cover 104 of FIG. 1. A series of fastener apertures (one denoted at 124) in the top cover 104 align with threaded apertures in the base deck 102 (one denoted at 126 in FIG. 1) to accommodate a number of fasteners 128 (FIG. 1) used to secure the top cover 104 to the base deck 102. Apertures 130 and 132 accommodate fasteners (not shown) to secure shafts of the spindle motor 106 and actuator 110. A compressible gasket 134 extends near the perimeter of the top cover 104 to effect a seal at the junction between the base deck 102 and top cover 104.

A recess 140 projects into the interior space of the housing 101. The filter 120 rests on a filter support surface of the recess 140 opposite that visible in FIG. 2.

The recess 140 is provided with an interior surface 141 and a plurality of pass-through apertures 142 through which portions of the recirculating currents flow to reach the filter 120. It will be understood that any number of the apertures 142 in the top cover material can be used, and such apertures can take any desired shapes so long as adequate structure remains within the top cover 104 to support the filter 120.

Preferably, a diffusion tube recess 144 is formed in the top cover 104, with a first end 146 in fluidic communication with the external environment and a second end 148 in fluidic communication with the recess 140. The recess 140, apertures 142 and diffusion tube recess 144 are preferably stamped or molded in place, depending upon the construction techniques used to fabricate the top cover 104.

Figure 3:
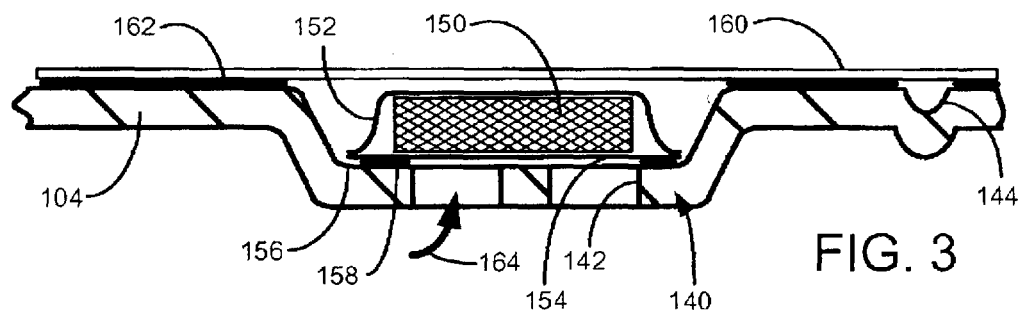
FIG. 3 provides an elevational, cross-sectional view of the filter assembly in conjunction with the top cover in accordance with a preferred embodiment.

FIG. 3 provides an elevational, cross-sectional representation of the filter 120 installed into the recess 140 of the top cover 104. It will be understood that various thicknesses and aspect ratios shown in FIG. 3 are representative only and will vary as desired depending upon the requirements of a given application.

The filter 120 preferably comprises a block of adsorbent media 150 encapsulated in permeable protective layers 152, 154. The media 150 preferably comprises an admixed volume of activated carbon and desiccant silica particles, although other chemically adsorbent materials can readily be used.

During fabrication, the filter 120 is placed onto an exterior filter support surface 156 of the recess 140. Preferably, the filter 120 is affixed to the support surface 156 using a layer of adhesive 158 applied to the perimeter of the filter 120. It will be noted that the filter support surface 156 surrounds the filter access apertures 142, so that the filter 120 spans the apertures when the filter is supported on the filter support surface 156.

A fluid-impermeable seal 160 is next applied to the top cover 104 using another layer of adhesive 162, with the seal 160 having a sufficient areal extent to cover the filter 120 and the diffusion tube recess 144. Although not shown, it will be understood that the seal 160 is provided with a small pass-through aperture that aligns with the first end 146 of the diffusion tube recess 144 (FIG. 2) to permit formation of a diffusion tube to allow flow of fluid between the interior of the housing 101 and the external environment.

In this way, the filter 120 advantageously operates as a chemical adsorbent filter to filter internal recirculating fluidic currents within the housing 101 (denoted by arrow 164), as well as a breather filter to filter fluids passing between the interior of the housing 101 and the exterior environment.

Preferably, the depth of the recess 140 is selected to accommodate the thickness of the filter 120 so that the seal 160 remains substantially in a coplanar relationship with the top cover 104, as shown. This ensures that overall form-factor dimensions of the data storage device 100 are maintained.

Figure 4:
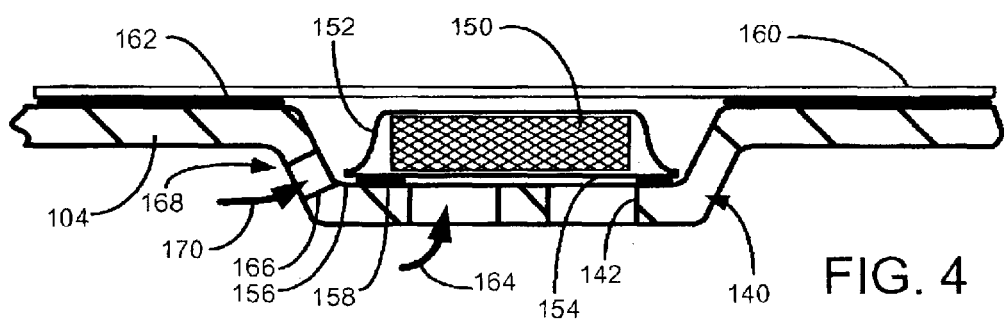
FIG. 4 provides an elevational, cross-sectional view of the filter assembly in conjunction with the top cover in accordance with another preferred embodiment.

FIG. 4 provides another view of the filter 120 in conjunction with portions of the top cover 104 in accordance with another preferred embodiment. The configuration of the embodiment of FIG. 4 is similar to that shown in FIG. 3 and like reference numerals are used for similar components shown in each figure.

The embodiment of FIG. 4 additionally employs one or more pass-through apertures 166 in one or more sidewalls 168 of the recess 140. The apertures can be angled as shown, or can extend parallel to the interior surface 156 of the recess 140.

When the apertures 166 are placed within the leading edge of the recess, impinging fluidic currents (such as denoted at 170) can be advantageously directed to the filter 120, further enhancing the volume of fluid passing across the filter as well as potentially reducing the accumulation of contaminants along the leading edge. The embodiment of FIG. 4 is particularly well suited when the filter 120 is to be used as an internal chemical adsorbent filter only and not as a breather filter as well. However, if a diffusion path is also incorporated into the embodiment of FIG. 4, care should be taken to provide adequate sealing to avoid allowing fluid to bypass the filter 120 when flowing between the interior of the housing 101 and the external environment.

Figure 5:
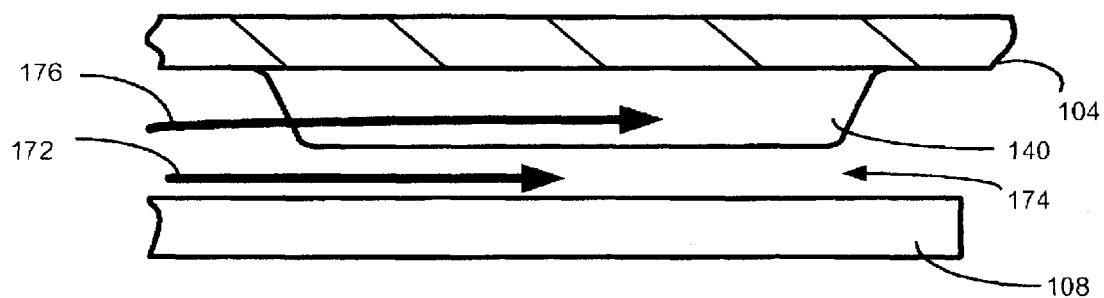
FIG. 5 provides an elevational view of the top cover and top disc to illustrate preferred flow of fluidic currents within the data storage device.

FIG. 5 provides an interior, elevational view of the top cover 104 and recess 140 in conjunction with the top disc 108, to further illustrate the manner in which the filter 120 and recess 140 preferably operate to direct fluidic currents within the housing 101.

As the recirculating fluidic currents are established within the housing 101 (and generally flow in the direction 109 shown in FIG. 1), a first portion of the currents (denoted at 172) passes down into a gap 174 between the recess 140 and the associated disc 108. This first portion 172 encounters the apertures 142 in the recess 140 which provide access to the filter 120 as discussed above. A second portion of the currents (denoted at 176 passes across the leading edge sidewall 166 and is diverted around the recess 140 to other locations within the housing 101, such as to the recirculation filter 122 as shown in FIG. 1 and/or to the VCM 116 for convective cooling of the coil 114.

Figure 6:
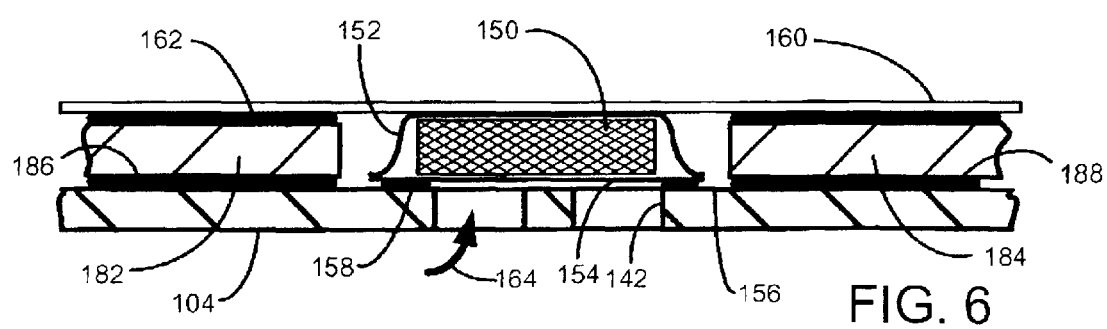
FIG. 6 provides an elevational, cross-sectional view of the filter assembly in conjunction with the top cover in accordance with yet another preferred embodiment.

FIG. 6 provides an elevational view of the filter 120 and top cover 104 in accordance with another preferred embodiment. In this embodiment, the filter support surface 156 is substantially coplanar with remaining portions of the top cover 104.

Rigid vibration damping plates 182, 184 are placed adjacent the filter 120 and are secured to the top cover 104 using adhesive layers 186, 188 to provide constrain layer damping of the housing 101. As before, a seal 160 is placed across the filter and extends to the plates 182, 184. Preferably, the thicknesses of the plates 182, 184 substantially equal the thickness of the filter 120, so that the filter is "recessed" within the effective overall thickness of the top cover assembly, as before.

Figure 7:
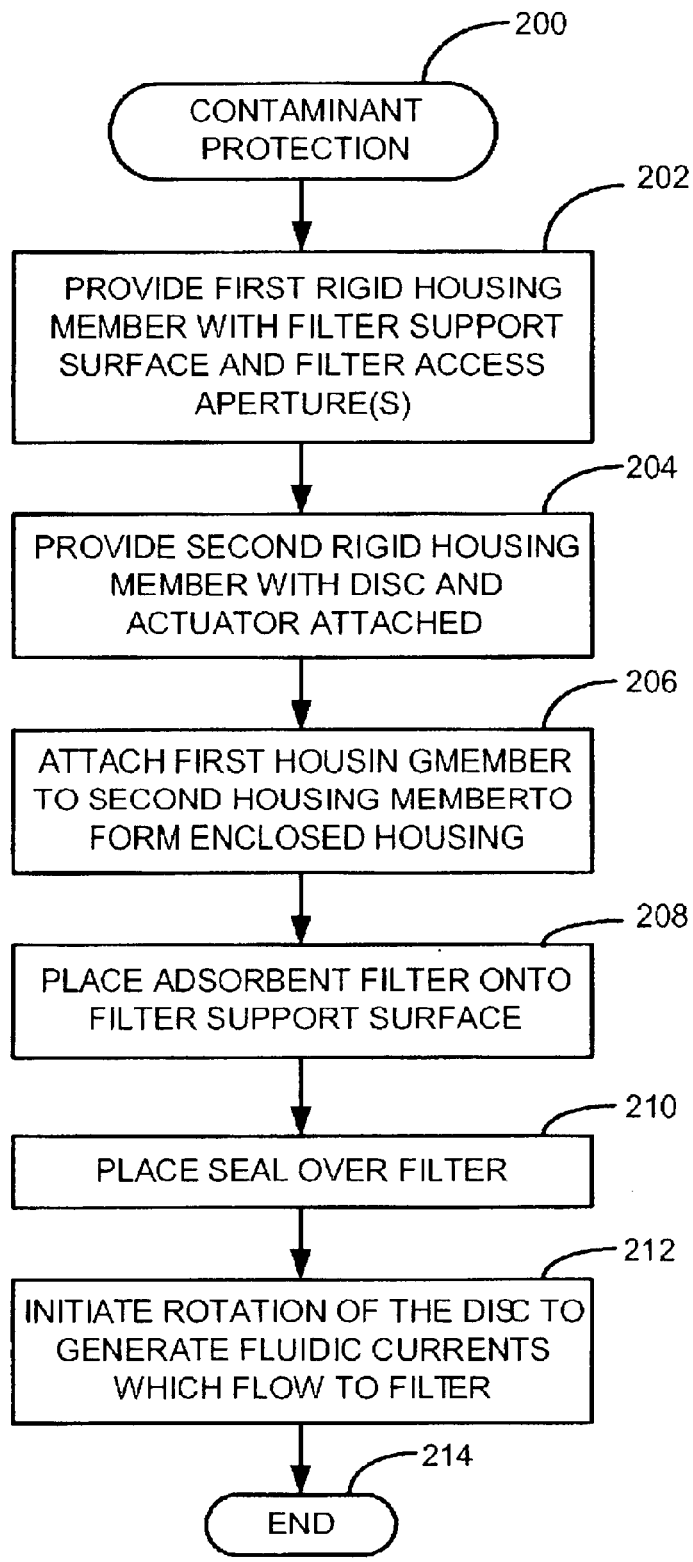
FIG. 7 provides a flow chart for a CONTAMINANT PROTECTION routine, illustrative of steps carried out in accordance with preferred embodiments of the present invention to protect the data storage device from fluid-borne vapor phase and particulate contaminants.

FIG. 7 provides a flow chart for a CONTAMINANT PROTECTION routine 200, generally illustrative of steps carried out in accordance with preferred embodiments of the present invention to protect a data storage device (such as 100) from fluid-borne contaminants. It will be understood that the routine 200 preferably describes fabrication of the data storage device in an automated, top down assembly environment.

At step 202, a first rigid housing member (such as the top cover 104) is provided with an exterior filter support surface (such as 156), an opposing interior surface (such as 141) and one or more filter access apertures (such as 142) which extend from the interior surface to the exterior filter support surface.

At step 204, a second rigid housing member (such as the base deck 102) is provided supporting various mechanical components including a rotatable disc (such as 108) and an actuator (such as 110) supporting a data transducing head (such as 112).

At step 206, the first housing member from step 202 is attached to the second housing member of step 204 to form an enclosed housing (such as 101) in which the disc, actuator and head are disposed.

A contaminant adsorbent filter (such as 120) is next placed onto the exterior filter support surface of the first housing member at step 208, and a seal is placed over the filter at step 210 to seal the filter from the environment external to the housing.

During subsequent operation of the data storage device, rotation of the disc is initiated at step 212 to generate fluidic currents. A first portion of the fluidic currents (such as 172) passes across the interior surface, through the filter access apertures and to the filter where fluidic-borne contaminants are adsorbed.

Preferably, the filter support surface of the first housing member is part of a recess (such as 140) which projects into the housing. In this case during step 212 a second portion of the fluidic currents (such as 176) passes across a sidewall (such as 166) of the recess and is directed away from the filter and to a recirculation filter (such as 122) and/or directed to a voice coil motor (such as 116) for convective cooling thereof.

The routine is shown to end at step 214, but it will be understood that step 212 is thereafter repeated each time the drive is activated.

The embodiments discussed herein provide several advantages over the prior art. Effective vapor phase and particulate contaminant filtering takes place through the efficient directing of fluidic currents to the adsorbent filter 120.

The placement and configuration of the adsorbent filter 120 adjacent a disc recording surface facilitates a significant increase in the amount of adsorbent media that can be incorporated into the housing 101, which is especially beneficial in smaller form factor designs.

The use of the recess 140 further operates as an effective channel to control the flow of fluidic currents within the housing 101, including separating flows to the filter 120, to the recirculation filter 122, to the VCM 116, etc. The filter 120 also potentially reduces costs by further operating as a high capacity, low resistance breather filter for a diffusion path extending through the housing 101, eliminating the need for a separate breather filter.

Moreover, the filter 120 can readily be incorporated into an automated, top-down assembly environment, thereby reducing installation complexity and costs. The filter can be installed either before or after the top cover 104 has been mated onto the base deck 102, further adding flexibility to the assembly process.

It will now be understood that the present invention (as embodied herein and as claimed below) is generally directed to a method and apparatus for protecting a data storage device from contaminants.

In accordance with one aspect, the data storage device (such as disc drive 100) comprises an enclosed housing (such as 101) formed from a substantially planar, rigid first plate member (such as top cover 104) affixed to a substantially planar, rigid second plate member (such as base deck 102). The first plate member includes a plate thickness, a filter access aperture (such as 142) which extends through the plate thickness and an exterior filter support surface (such as 156) which surrounds the filter access aperture. A rotatable disc (such as 108) is supported within the housing for rotation during operation of the device.

A contaminant adsorbent filter (such as 120) is disposed upon the exterior filter support surface and spans the filter access aperture. During rotation of the disc, fluidic currents pass into a gap (such as 174) between the disc and the first plate member, through the filter access aperture and to the adsorbent filter.

The adsorbent filter is preferably installed in a top-down automated assembly environment and is placed onto the exterior filter support surface after the first housing member is attached to the second housing member.

Preferably, the adsorbent filter is affixed to the exterior filter support surface using a layer of adhesive (such as 156). A seal (such as 160) preferably spans the filter and is preferably affixed to the first plate member using a layer of adhesive (such as 162).

The exterior filter support surface of the first plate member is preferably formed as a portion of a recess (such as 140) which projects toward the data recording disc. The recess preferably has a depth selected to substantially match a thickness of the adsorbent filter.

The recess is provided with at least one sidewall (such as 168) adjacent the exterior filter support surface. The sidewall is preferably configured to direct a portion of the recirculating fluidic currents (such as 176) away from the adsorbent filter. One or more filter access apertures (such as 166) are preferably formed in the at least one sidewall to further direct the recirculation currents to the filter.

The first plate member further preferably comprises an elongated diffusion tube recess (such as 144) having a first end (such as 148) in fluidic communication with the exterior filter support surface, and the seal further extends adjacent the diffusion tube recess to form a diffusion tube from the exterior filter support surface to a second end of the diffusion tube recess (such as 146) disposed in fluidic communication with an environment external to the enclosed housing.

As desired, a rigid damping member (such as 182, 184) can be preferably affixed to the first plate member adjacent the exterior filter support surface to provide constrain layer damping of the first rigid housing member. A thickness of the rigid damping member of the attaching step is preferably selected to nominally match a thickness of the adsorbent filter.

In accordance with another aspect, the method generally includes steps of providing a first rigid housing member with an exterior filter support surface, an opposing interior surface and at least one filter access aperture which projects from the interior surface to the exterior filter support surface (such as by step 202).

A contaminant adsorbent filter is placed on the exterior filter support surface to span and be in fluidic communication with the at least one filter access aperture (such as by step 208). A seal is applied to the first rigid housing member opposite the interior surface to encapsulate the adsorbent filter (such as by step 210). In this way, during subsequent rotation of a data recording disc adjacent the interior surface, fluidic currents pass across the interior surface, through the at least one filter access aperture and to the adsorbent filter (such as by step 212).

Preferably, the method further includes supplying a second rigid housing member (such as by step 204), and attaching the first rigid housing member to the second rigid housing member to form an enclosed housing (such as by step 206). The attaching of the first rigid housing member to the second rigid housing member is preferably carried out prior to the placing of the adsorbent filter onto the filter support surface, allowing fabrication in a top down automated environment.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the filter assembly without departing from the spirit and scope of the present invention.

In addition, although the embodiments described herein are directed to the filtering of contaminants for a disc drive data storage device, it will be appreciated by those skilled in the art that the assembly can be used for other types of data storage devices, including optical drives and magneto-optical drives, without departing from the spirit and scope of the claimed invention.

What is claimed is:

1. A data storage device, comprising:
   an enclosed housing comprising a substantially planar, rigid first plate member affixed to a substantially planar, rigid second plate member, the first plate member having a plate thickness, a filter access aperture which extends through the plate thickness and an exterior filter support surface which surrounds the filter access aperture;
   a rotatable disc supported within the enclosed housing; and a contaminant adsorbent filter disposed upon the exterior filter support surface and which spans the filter access aperture, wherein during rotation of the disc, fluidic currents pass into a gap between the disc and the first plate member, wherein a first portion of the fluidic currents pass through the filter access aperture and to the adsorbent filter and a second portion of the fluidic currents are directed to other areas of the housing.

2. The data storage device of claim 1, further comprising an external seal affixed to the first plate member and which spans the adsorbent filter to seal the adsorbent filter from an environment external to the enclosed housing.

3. The data storage device of claim 2, wherein the seal is affixed to the first rigid housing member using a layer of adhesive.

4. The data storage device of claim 2, wherein the first plate member further comprises an elongated diffusion tube recess having a first end in fluidic communication with the exterior filter support surface, and wherein the seal further extends adjacent the diffusion tube recess to form a diffusion tube from the exterior filter support surface to a second end of the diffusion tube recess disposed in fluidic communication with the environment external to the enclosed housing.

5. The data storage device of claim 1, wherein the adsorbent filter is affixed to the exterior filter support surface using a layer of adhesive.

6. The data storage device of claim 1, wherein the adsorbent filter is placed adjacent the exterior filter support surface after the first plate member is affixed to the second plate member.

7. The data storage device of claim 1, wherein the exterior filter support surface of the first plate member is formed as a portion of a recess which projects toward the data recording disc.

8. The data storage device of claim 7, wherein the recess further comprises a sidewall adjacent the exterior filter support surface, the sidewall configured to direct the second portion of the recirculating fluidic currents away from the adsorbent filter.

9. The data storage device of claim 8, wherein the sidewall further comprises at least one additional filter access aperture through which a portion of the fluidic currents passes to the adsorbent filter.

10. The data storage device of claim 1, further comprising a rigid damping member affixed to the first plate member adjacent the exterior filter support surface to provide constrain layer damping of the first plate member.

11. The data storage device of claim 10, wherein a thickness of the rigid damping member of the attaching step is selected to nominally match a thickness of the adsorbent filter.

* * * * *